United States Patent
Scheu et al.

(10) Patent No.: US 11,261,355 B2
(45) Date of Patent: Mar. 1, 2022

(54) HOT MELT ADHESIVE COMPOSITIONS CONTAINING PROPYLENE COPOLYMERS AND METHODS FOR USING THE SAME

(71) Applicant: Bostik, Inc., Wauwatosa, WI (US)

(72) Inventors: Jill Marie Scheu, Menomonee Falls, WI (US); Kimberly Eileen Secrist, Wauwatosa, WI (US); Kathleen M. Farris, West Allis, WI (US)

(73) Assignee: Bostik, Inc., Wauwatosa, WI (US)

( * ) Notice: Subject to any disclaimer, the term of this patent is extended or adjusted under 35 U.S.C. 154(b) by 288 days.

(21) Appl. No.: 16/260,577

(22) Filed: Jan. 29, 2019

(65) Prior Publication Data

US 2019/0233687 A1 Aug. 1, 2019

Related U.S. Application Data

(60) Provisional application No. 62/624,369, filed on Jan. 31, 2018.

(51) Int. Cl.
*C09J 123/16* (2006.01)
*C09J 5/00* (2006.01)
(Continued)

(52) U.S. Cl.
CPC ............ *C09J 123/16* (2013.01); *B32B 27/32* (2013.01); *C09J 5/00* (2013.01); *C09J 11/08* (2013.01);
(Continued)

(58) Field of Classification Search
CPC ........ C09J 123/16; C09J 123/142; C09J 5/00; C09J 11/08; C09J 2301/50;
(Continued)

(56) References Cited

U.S. PATENT DOCUMENTS

| 5,723,546 A | 3/1998 | Sustic |
| 6,218,457 B1 | 4/2001 | Fralich et al. |

(Continued)

FOREIGN PATENT DOCUMENTS

| WO | WO 2012/009489 A2 | 1/2012 |
| WO | WO 2014/194074 A1 | 12/2014 |

(Continued)

OTHER PUBLICATIONS

H.B. Fuller Company, Duty of Candor Under 37 CFR 1.56, A Disposable Absorbent Article and a Method for Making the Same, May 2012-May 29, 2013.

(Continued)

*Primary Examiner* — Daniel H Lee
(74) *Attorney, Agent, or Firm* — Christopher R. Lewis (57) ABSTRACT

A hot melt adhesive composition, which may be used as a construction adhesive in hygiene articles, comprises a first polymer comprising a unimodal copolymer of propylene and ethylene and having a weight average molecular weight of between about 5,000 and 60,000 daltons; a second polymer comprising a copolymer of propylene and ethylene and having a weight average molecular weight of at least 100,000 daltons; a tackifying resin having a Ring & Ball softening point of at most 115° C.; and a plasticizer. The composition demonstrates good peel strength and good shear resistance and is sprayable, with a sufficiently low viscosity, at low application temperatures, such as at about 121° C.

19 Claims, 2 Drawing Sheets

(51) Int. Cl.
*C09J 11/08* (2006.01)
*B32B 27/32* (2006.01)
*C09J 123/14* (2006.01)
*C08K 5/00* (2006.01)

(52) U.S. Cl.
CPC ......... *C09J 123/142* (2013.01); *C08K 5/0016* (2013.01); *C08L 2205/025* (2013.01); *C09J 2301/50* (2020.08); *C09J 2400/263* (2013.01); *C09J 2423/046* (2013.01)

(58) Field of Classification Search
CPC ........... C09J 2423/046; C09J 2400/263; B32B 27/32; B32B 7/12; B32B 27/308; B32B 29/005; B32B 5/022; B32B 27/08; B32B 21/06; B32B 27/12; B32B 2250/02; B32B 2262/0253; B32B 2307/748; B32B 27/10; B32B 27/302; B32B 27/304; B32B 21/08; B32B 21/042; B32B 2262/0276; B32B 2555/00; B32B 2262/0238; B32B 2307/542; B32B 2262/023; B32B 2262/0246; B32B 2535/00; B32B 27/36; C08L 2205/025; C08K 5/0016

See application file for complete search history.

(56) References Cited

U.S. PATENT DOCUMENTS

| | | | |
|---|---|---|---|
| 6,872,279 | B1 | 3/2005 | Kolowrot et al. |
| 7,067,585 | B2 | 6/2006 | Wang et al. |
| 8,366,865 | B2 | 2/2013 | Terfloth et al. |
| 9,109,143 | B2 | 8/2015 | Tse et al. |
| 9,359,535 | B2 | 6/2016 | Coffey et al. |
| 9,783,712 | B2 | 10/2017 | Hamann et al. |
| 2007/0142801 | A1 | 6/2007 | Zhou et al. |
| 2012/0178333 | A1 | 7/2012 | Fowler et al. |
| 2012/0329353 | A1 | 12/2012 | Davis et al. |
| 2013/0302590 | A1 | 11/2013 | Hatanaka et al. |
| 2014/0358100 | A1* | 12/2014 | Remmers .......... A61F 13/49009 604/365 |
| 2015/0322302 | A1 | 11/2015 | Hu et al. |
| 2016/0102230 | A1 | 4/2016 | Gray et al. |
| 2016/0376478 | A1 | 12/2016 | Austin et al. |
| 2017/0058153 | A1 | 3/2017 | Schroeyers et al. |
| 2017/0058155 | A1 | 3/2017 | Austin et al. |
| 2017/0073556 | A1 | 3/2017 | Tripathy et al. |
| 2017/0290945 | A1 | 10/2017 | Hanson et al. |
| 2018/0002579 | A1 | 1/2018 | Hu et al. |

FOREIGN PATENT DOCUMENTS

| | | |
|---|---|---|
| WO | WO 2015/146845 A1 | 10/2015 |
| WO | WO2016073868 A1 | 5/2016 |
| WO | WO 2017/123874 A1 | 7/2017 |
| WO | WO 2018/027055 A1 | 2/2018 |

OTHER PUBLICATIONS

U.S. Appl. No. 14/290,420 (now U.S. Pat. No. 10,350,325) on Nov. 22, 2016.

Clariant Ecotain—Product Sheet of Licocene PP 1602 Granules "Low-Crystalline Metallocene Propylene-Ethylene-Copolymer" Dec. 10, 2020; Edition No. 15.

* cited by examiner

HOT MELT ADHESIVE COMPOSITIONS CONTAINING PROPYLENE COPOLYMERS AND METHODS FOR USING THE SAME

CROSS-REFERENCE TO RELATED APPLICATION

This application claims the benefit under 35 U.S.C. § 119(e) of U.S. Patent Application No. 62/624,369, filed on Jan. 31, 2018.

FIELD OF THE INVENTION

The present invention relates to hot melt adhesives, and more particularly to hot melt adhesives based on polyolefins. These adhesives are useful in bonding various substrates together and are especially useful as constructive adhesives for the manufacture of disposable consumer articles, such as diapers, feminine sanitary napkins, adult incontinent products, medical gowns, and the like.

BACKGROUND OF THE INVENTION

Hot melt adhesives typically exist as a solid mass at ambient temperature and can be converted to a flowable liquid by the application of heat. These adhesives are particularly useful in manufacturing a variety of disposable goods where bonding of various substrates is often necessary. Specific applications include disposable diapers, hospital pads, feminine sanitary napkins, panty shields, surgical drapes and adult incontinent briefs, collectively known as disposable nonwoven hygiene products. Other diversified applications have involved paper products, packaging materials, automotive headliners, appliances, tapes, and labels. In most of these applications, the hot melt adhesive is heated to its molten state and then applied to a substrate, often named as the primary substrate. A second substrate, often named as the secondary substrate, is then immediately brought into contact with and compressed against the first. The adhesive solidifies on cooling to form a strong bond. The major advantage of hot melt adhesives is the absence of a liquid carrier, as would be the case of water or solvent based adhesives, thereby eliminating the costly process associated with solvent removal.

For many applications, hot melt adhesives are often extruded directly onto a substrate in the form of a thin film or a bead by using piston or gear pump equipment. In this case, the substrate is brought into intimate contact with a hot die under pressure. The temperature of the die must be maintained well above the melting point of the adhesive to allow the molten hot melt material to flow through the application nozzle smoothly. For most applications, particularly those encountered in food packaging and disposable nonwovens hygienic article manufacturing, bonding of delicate and heat sensitive substrates, such as thin gauge plastic films, is often involved. This imposes an upper limit on coating temperature for hot melt adhesive applications. Today's commercial hot melts are typically formulated to have coating temperatures below 200° C., preferably below 150° C., to avoid substrate burning or distortion.

Besides directly coating, several indirect or noncontact coating methods, through which a hot melt adhesive can be spray coated with the aid of compressed air onto a substrate from a distance, are also developed. These non-contact coating techniques include conventional spiral spray, Omega™, Surewrap™ and various forms of melt-blown methods. The indirect method, however, requires that the viscosity of the adhesives must be sufficiently low, usually in the range of 2,000 to 30,000 mPa·s, preferably in the range of 2,000 to 15,000 mPa·s, at the application temperature in order to obtain an acceptable coating pattern. Many other physical factors, especially the rheological properties of the adhesive, come into play in determining the sprayability of a hot melt. The majority of commercial polyolefin hot melt products do not lend themselves to spray applications. There are no accepted theoretical models or guidelines to predict sprayability, which must be determined empirically with application equipment.

Hot melt adhesives are organic materials typically consisting of a polymer, a plasticizer, a tackifying resin, and an antioxidant package. Other ingredients, such as wax, filler, colorant and UV absorber, can also be used to modify the adhesive properties or to provide special attributes. These organic ingredients are prone to heat degradation under the coating conditions of the adhesive. For example, certain widely used commercial hot melt adhesives based on styrene-isoprene-styrene (SIS) triblock copolymer, when subjected to 175° C. for 24 hours, can suffer from a viscosity drop of about 50 percent from its original value. A styrene-butadiene-styrene (SBS) based hot melt may cause problems by crosslinking under similar conditions. Crosslinking can result in a dramatic increase in viscosity and may eventually render the adhesive un-flowable by the formation of a three dimensional polymer network. The viscosity change is often accompanied by charring, gelling, and formation of skin on top of the molten material. The degradation will inevitably lead to deterioration of the adhesive properties and performance. In addition, such degradation can also cause equipment damage. The rate of degradation is temperature dependent; the higher the temperature, the faster the degradation. Thus, reducing the coating temperature of the adhesive can slow down degradation.

Hot melt "construction adhesives" for disposable consumer hygiene articles bond various nonwoven materials with low surface energy thermoplastic films, such as polylactic acid, polyethylene, or untreated polypropylene. The use of thinner polyolefin back sheets in the manufacture of disposable articles requires the use of lower viscosity hot melts in order to prevent burn-through and distortion when the adhesive is applied. Construction adhesives should have good shear strength, but additionally must have strong peel strength, particularly at low add-on levels such as 1 or 2 grams per square meter.

Efforts have been made to develop hot melt adhesives. U.S. Patent Application Publication No. 2015/0322302 discloses a low application temperature hot melt adhesive comprising olefin copolymers with an average melt index greater than 5 but less than about 35 g/10 minutes at 190° C. The adhesive is particularly useful in the construction of nonwoven articles. U.S. Pat. No. 9,109,143 discloses a hot melt adhesive comprising two polypropylene-based copolymers having an average molecular weight of 100,000 daltons or less. U.S. Patent Application Publication No. 2016/0376478 discloses an adhesive composition comprising 30-80 wt % of a polymer blend and 2-20 wt % of an oil. The blend has a first and second propylene-based polymer which are different from one another in some way. The difference may be measured, for example, by the comonomer content, heat of fusion, crystallinity, branching index, weight average molecular weight, and/or polydispersity of the two polymers. The adhesive may further comprise a higher molecular weight propylene-based polymer in the amount of about 1 to about 10 wt % to allow for a higher oil content.

SUMMARY OF THE INVENTION

It would be advantageous to provide a hot melt adhesive that will serve especially well as a construction adhesive. To do so, it is desirable that the adhesive have adequate peel performance and shear strength, have a sufficiently low viscosity at the desired application temperature (which preferably is as low as possible), and be sprayable at the application temperature. Being "sprayable" means that the adhesive conforms consistently to a desired spray pattern with minimal loss of adhesive. Embodiments of the present invention achieve all of these needs.

In accordance with an embodiment of the present invention, a hot melt adhesive composition comprises: (a) about 30% to about 72% by weight of a first polymer comprising a unimodal copolymer of propylene and ethylene and having a weight average molecular weight of between about 5,000 and 60,000 daltons; (b) about 0.1% to about 8% of a second polymer comprising a copolymer of propylene and ethylene and having a weight average molecular weight of at least 100,000 daltons; (c) about 25% to about 65% by weight of a tackifying resin having a Ring & Ball softening point of at most 115° C.; and (d) about 2% to about 25% by weight of a plasticizer, wherein the weight ratio of the first polymer to the second polymer is between about 500:1 and 9:1 and the viscosity of the composition is equal to or less than about 35,000 cP at 121° C.

According to another embodiment of the invention, a hot melt adhesive composition comprises: (a) a first polymer comprising a unimodal copolymer of propylene and ethylene and having a weight average molecular weight of between about 5,000 and 60,000 daltons; (b) a second polymer comprising a copolymer of propylene and ethylene and having a weight average molecular weight of at least 100,000 daltons; a tackifying resin having a Ring & Ball softening point of at most 115° C.; and a plasticizer, wherein the viscosity of the composition is equal to or less than about 35,000 cP at 121° C. and the first polymer, the second polymer, the tackifying resin, and the plasticizer are present in amounts effective to provide a hot melt adhesive composition which has: (1) a peel strength of at least 150 grams-force initially and at least 250 grams-force after aging at 54.5° C. when applied at 2 gsm add-on between a polyethylene film and a non-woven layer; (2) a peel strength of at least 100 grams-force initially when applied at 1 gsm add-on between a polyethylene film and a non-woven layer; and (3) a shear value of at least 50 minutes at 37.8° C. when applied between two non-woven layers and using a 250 gram weight.

According to another embodiment of the invention, a method of making a laminate comprises the steps of applying a hot melt adhesive composition according to any embodiment of the present invention in a molten state to a primary substrate and mating a secondary substrate to the first substrate by contacting the secondary substrate with the adhesive composition. In an embodiment in which the hot melt adhesive is used as a construction adhesive, the primary substrate is a polyethylene film and the secondary substrate is a non-woven layer.

It is to be understood that both the foregoing general description and the following detailed description are exemplary, but are not restrictive, of the invention.

DETAILED DESCRIPTION OF THE INVENTION

According to an embodiment of the present invention, a hot melt adhesive composition comprises: (a) about 30% to about 72% by weight of a first polymer comprising a unimodal copolymer of propylene and ethylene and having a weight average molecular weight of between about 5,000 and 60,000 daltons; (b) about 0.1% to about 8% of a second polymer comprising a copolymer of propylene and ethylene and having a weight average molecular weight of at least 100,000 daltons; (c) about 25% to about 65% by weight of a tackifying resin having a Ring & Ball softening point of at most 115° C.; and (d) about 2% to about 25% by weight of a plasticizer, wherein the weight ratio of the first polymer to the second polymer is between about 500:1 and 9:1 and the viscosity of the composition (measured by ASTM D3236 by using a Brookfield viscometer at 121° C.) is equal to or less than about 35,000 cP. All percentages herein are by weight based on the total weight of the adhesive unless specifically noted otherwise.

Embodiments of the present invention are an adhesive based on mixtures of a low molecular weight first polymer and a high molecular weight second polymer in a relatively high weight ratio of first polymer to second polymer. In preferred embodiments, the weight ratio of the first polymer to the second polymer is between about 200:1 and 9:1, preferably between about 75:1 and about 10:1, and most preferably between about 50:1 and about 15:1. When a number of ranges of a property (including this ratio) or amount of a constituent are provided herein, the invention includes a range of that property or amount extending from the lower limit of a first range and an upper limit of a second range of that property or amount. Thus, as an example, the invention includes ranges of a weight ratio of the first polymer to the second polymer of between about 200:1 and 15:1, between about 75:1 and about 9:1, and between about 50:1 and about 10:1. Adhesives according to embodiments of the present invention exhibit excellent shear strength and peel resistance, even at low add-on levels such as 1 or 2 grams per square meter, and maintain sufficiently low viscosity to be sprayed even at relatively low temperature. Such properties make adhesives of the invention useful for hygiene, construction, and packaging applications.

The first polymer of the invention is unimodal, meaning that it does not constitute a blend or mixture of two polymers or of two different grades of the same polymer. For example, the unimodal first polymer of the present invention is not a mixture of two polymers having different average molecular weights. Stated another way, the unimodal first polymer is the result of a single process for making a polymer and not a mixture of two different polymers or two different grades of the same polymer (i.e., the same polymer with two different average molecular weights). Therefore, the properties, such as molecular weight, of a unimodal first polymer of the present invention generally have bell-shaped curves.

The unimodal nature of the first polymer exists for all of its properties, such as comonomer content, heat of fusion, crystallinity, branching index, melting point, glass transition temperature, density, and polydispersity, in addition to molecular weight. In an embodiment of the invention, the second polymer is also unimodal.

Generally, the weight average molecular weight of the first polymer is between about 5,000 and 60,000 daltons. Preferably, the weight average molecular weight of the first polymer is between about 20,000 and about 55,000 daltons, more preferably between about 30,000 and about 52,000 daltons, still more preferably between about 35,000 and about 50,000 daltons, and most preferably between about 40,000 and about 48,000 daltons. Generally, the weight average molecular weight of the second polymer is between about 100,000 and 250,000 daltons. Preferably, the weight average molecular weight of the second polymer is between about 100,000 and about 200,000 daltons, more preferably between about 100,000 and about 150,000 daltons, and most preferably between about 105,000 and about 125,000 daltons. Weight average molecular weight is characterized using a High Temperature Size Exclusion Chromatograph (SEC) using a polystyrene reference standard.

The first and second polymers may have heats of fusion that vary over a wide range and may be the same or different. Preferably, the first polymer has a heat of fusion of between about 5 and about 35 J/g, preferably between about 10 and about 29 J/g, more preferably between about 15 and about 25 J/g, and most preferably between about 18 and about 22 J/g. Preferably, the second polymer has a heat of fusion of between about 2.5 and about 25 J/g, preferably between about 3 and about 15 J/g, more preferably between about 3.5 and about 10 J/g, and most preferably between about 6 and about 9 J/g. Heat of fusion values provided herein are determined according to ASTM E793-01 "Standard Test Method for Enthalpies of Fusion and Crystallization by Differential Scanning Calorimetry" except with the one modification that a scanning temperature of 20° C. per minute was used instead of 10° C. per minute.

The polydispersity indices of the first polymer and second polymer may vary over a wide range and may be the same or different. The polydispersity indices of the two polymers is preferably between about 1.5 and about 6, more preferably between about 1.8 and about 5, even more preferably between about 2 and about 3, and most preferably between about 2.2 and about 2.8.

Both the first and second polymers are comprised primarily of propylene units. This means that they comprise at least 50 weight percent of propylene. Preferably, the first and second polymers have an ethylene content of between about 5% and about 25%, more preferably between about 7% and about 20%, even more preferably between about 9% and about 17%, and most preferably between about 10% and about 15%. The first and second polymers may have the same or different ethylene content.

The melting temperatures, also referred to as the melting points, of the first and second polymer may vary over a wide range. Preferably, the melting temperature of the first polymer is between about 70° C. and about 130° C. More preferably, the melting temperature of the first polymer is between about 75° C. and about 125° C., even more preferably between about 85° C. and about 115° C., and most preferably between about 90° C. and about 110° C. Preferably, the melting temperature of the second polymer is between about 35° C. and 100° C. More preferably, the melting temperature of the second polymer is between about 40° C. and about 90° C., even more preferably between about 50° C. and about 80° C., and most preferably between about 55° C. and about 75° C. The melting temperatures of the first and second polymer may be the same or different. The melting temperature as described herein is measured using Differential Scanning Calorimetry (DSC) according to ASTM E-794-01 except with one modification to the test in that a scanning temperature of 20° C. per minute instead of 10° C. per minute was used (the "DSC melting point").

The glass transition temperatures of the first and second polymer may also vary over a wide range. Preferably, the glass transition temperatures of the first and second polymer are between about −45° C. and about −5° C. More preferably, the glass transition temperatures are between −35° C. and −15° C., even more preferably between about −32° C. and −20° C., and most preferably between about −30° C. and −22° C. The glass transition temperatures of the first and second polymer may be the same or different. The glass transition temperature as described herein is measured using Differential Scanning Calorimetry (DSC) according to ASTM E-794-01 except with one modification to the test in that a scanning temperature of 20° C. per minute instead of 10° C. per minute was used.

The hot melt adhesive composition of the present invention also includes a tackifying resin (also referred to herein as a "tackifier") having a Ring & Ball softening point of at most 115° C. As defined in the present description, the tackifier can be a molecule or a macro-molecule and generally is a chemical compound or a fairly low molecular weight polymer, compared to common polymers, from a natural source or from a chemical process or combination thereof that in general enhances the adhesion of a final hot melt adhesive composition. Representative resins include the C5/C9 hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of terepene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Mixtures of two or more of the above described tackifying resins may be required for some formulations. Also included are the cyclic or acyclic C5 resins and aromatic modified acyclic or cyclic resins.

In an embodiment of the invention, the tackifier is selected from the group consisting of aliphatic and cycloaliphatic hydrocarbon resins and their hydrogenated derivatives, hydrogenated aromatic hydrocarbon resins, aromatically modified aliphatic or cycloaliphatic resins and their hydrogenated derivatives, polyterpene and styrenated polyterpene resins and mixtures thereof. In another embodiment of the invention, the tackifier is selected from the group consisting of a C-5 aliphatic hydrocarbon resin, a hydrogenated C-5 resin, a hydrogenated C-9 resin, a hydrogenated DCPD resin and an aromatic-modified DCPD resin.

In an embodiment of the invention, the tackifying resin has a Ring and Ball softening point (measured by ASTM E28) of at least about 40° C., most preferably between about 80° C. and 110° C. Even more preferably, the tackifier used herein has a Ring & Ball softening point of less than 108° C. and most preferably less than 105° C.

An embodiment of the present invention provides a hot melt adhesive composition comprising a tackifying resin in an amount of from about 25% to about 65%. Preferably, the tackifying resin is present in an amount of between about 30% and about 60%, more preferably between about 32% and about 50%, and most preferably between about 35% and about 45%, by weight.

The hot melt adhesive composition of the present invention also includes a plasticizer. Plasticizers may be used in the present invention to control the behavior of the adhesive during formulating, application, and end-use. The plasticizer component useful in the present invention may be selected from any of the mineral based oils, petroleum based oils, liquid resins, liquid elastomers, polybutene, polyisobutylene, phthalate and benzoate plasticizers, and epoxidized soya oil. Preferably, the plasticizer is selected from the group consisting of mineral oil and liquid polybutene, and even more preferably mineral oil with less than 30% aromatic carbon atoms. A plasticizer is broadly defined as a typically organic composition that can be added to the thermoplastic rubbers and other resins to improve extrudability, flexibility, workability and stretchability in the finished adhesive. Any material which flows at ambient or application temperatures and is compatible in the compositions of the present invention may be useful. Preferably, the plasticizer has low volatility at temperatures of greater than about 40° C. The most commonly used plasticizers are oils which are primarily hydrocarbon oils, low in aromatic content and are paraffinic or naphthenic in character. The oils are preferably low in volatility, transparent and have little color and negligible odor. This invention also may include olefin oligomers, low molecular weight polymers, synthetic hydrocarbon oils, vegetable oils and their derivatives and similar plasticizing oils. Solid plasticizers may also be useful to the present invention. Examples of such plasticizers include 1,4-cyclohexane dimethanol dibenzoate, glyceryl tribenzoate, pentaerythritol tetrabenzoate, and dicylcohexylphthalate. Preference is given to the petroleum based oils with suitable naphthenic minerals oils useful in this invention of the types herein described above are commercially available from Nynas, under the trade name Nyplast®. Suitable liquid plasticizers include polybutene such as Indopol series materials supplied by Ineos. As required, blends of plasticizers can also be employed to adjust end use performance and final properties.

The plasticizer may be used in an amount of about 2% to about 25% by weight, more preferably in an amount of between about 5% and about 20%, even more preferably between about 7% and about 18%, and most preferably between about 10% and about 16%, by weight. Blends of two or more plasticizers may also be used. For example, a blend of a first plasticizer and a second plasticizer that is different than the first plasticizer may also be employed. From about 1% to about 19% by weight of one or more additional plasticizers may be blended together with the first plasticizer if desired, to achieve the totals listed above.

The hot melt adhesive of the present invention may also include a stabilizer or an antioxidant in an amount of from about 0.1% to about 5% by weight. Preferably from about 0.1% to 2% of a stabilizer or antioxidant is incorporated into the composition. The stabilizers which are useful in the hot melt adhesive compositions of the present invention are incorporated to help protect the polymers noted above, and thereby the total adhesive system, from the effects of thermal and oxidative degradation which normally occur during the manufacture and application of the adhesive as well as in the ordinary exposure of the final product to the ambient environment. Among the applicable stabilizers are hindered phenols and multifunction phenols, such as sulfur and phosphorous-containing phenols. Antioxidants, such as hindered amine phenols, may be characterized as phenolic compounds that also contain bulky radicals in close proximity to the phenolic hydroxyl group thereof and are preferred. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus provides the phenolic compound with its stabilizing properties. Representative hindered phenols include:

1,3,5-trimethyl-2,4,6-tris(3-5-di-tert-butyl-4-hydroxybenzyl) benzene;
pentaerythritol tetrakis-3(3,5-di-tert-butyl-4-hydroxyphenyl)propionate;
n-octadecyl-3(3,5-di-tert-butyl-4-hydroxyphenyl) propionate;
4,4'-methylenebis(4-methyl-6-tertbutylphenol);
2,6-di-tert-butylphenol;
6-(4-hydroxyphenoxy)-2,4-bis(n-octylthio 1,3,5-triazine;
2,3,6-tris(4-hydroxy-3,5-di-tert-butyl-phenoxy,3,5-triazine
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-3(3,5-di-tert-butyl-4-hydroxy-phenyl)propionate.

Polyolefin nucleating agents may also be also present in the invention. Nucleating agents suitable for this invention are generally of the sub class of nucleating agents known as clarifying agents that are commonly employed in polyolefin additive packages to promote rapid crystallization. Suitable materials include dibenzylidene sorbitol derivatives such as Millad 3988 and Millad NX8000 supplied by Milliken as well as Irgaclear D produced by BASF. Other suitable agents include aromatic amide systems such as NJ Star NU-100 provided by New Japan Chemical Company. If included, the nucleating agent is generally present in the adhesive compositions in amounts of about 0.05 to 5% by weight of the composition, preferably about 0.1 to 2.5% by weight are utilized, and most preferably about 0.2 to 1.0% by weight. Blends of two or more nucleating agent may also be used. For example, a blend of a nucleating agent and a second nucleating agent that is different than the first nucleating agent may also be employed. From about 0.05% to about 5% by weight of one or more additional nucleating agent may be blended together with the first nucleating agent if desired. The nucleating agent may be used directly as a powder, as a slurry in a portion of suitable plasticizing agent, or as a component in a masterbatch of suitable polymer masterbatch such as Milliken NX-10. Nucleation packages such as those described in US 2015/0299526 can also be included to tailor the set up rate and bonding properties of the hot-melt adhesive.

It should be understood that other optional additives may be incorporated into the adhesive composition of the present invention in order to modify particular physical properties. These may include, for example, such materials as ultraviolet light (UV) absorbers, waxes, surfactants, inert colorants, titanium dioxide, fluorescing agents and fillers. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour and may be included in an amount up to 60% by weight, and preferably between 1 and 50% by weight.

In an embodiment of the invention, the hot melt adhesive composition does not include a wax. In embodiments of the invention in which wax is included, waxes may be included in the amount up to 20% by weight, preferably between 0.1% and 18% by weight. The wax may be selected from the group consisting of petroleum waxes, low molecular weight polyethylene and polypropylene, synthetic waxes and polyolefin waxes and mixtures thereof. In preferred embodiments, the wax is a low molecular weight polyethylene having a number average molecular weight of about 400 to about 6,000 g/mol.

The viscosity of the adhesive material according to the present invention should be generally at a viscosity at the application temperature appropriate to be processed and applied to its substrate. An adhesive with relatively low viscosity at a low application temperature is needed to be processed through standard hot melt adhesive equipment and to achieve the desired pattern and consequently suitable bonding performance at the application temperature. In general, the viscosity is equal to or less than about 35,000 cP at 121° C., preferably equal to or less than about 30,000 cP at 121° C., even more preferably less than about 25,000 cP at 121° C., still more preferably less than about 20,000 cP at 121° C. according to ASTM D3236. All viscosities identified herein are measured according to this modified ASTM standard. Preferably, the viscosity of the composition is at least 1,000 cP, more preferably at least 5,000 cP, still more preferably at least about 7,500 cP and most preferably at least about 15,000 cP, at 121° C. When several lower limits and upper limits of a value of a property are listed herein, the invention includes ranges between and including any of the lower limits to any of the upper limits. Thus the viscosity could be between 1,000 cP and 35,000 cP and between 5,000 cP and 20,000 cP at 121° C. In other embodiments, the viscosity of the composition is between any of the ranges contemplated herein at various typically used application temperatures between 121° C. at 149° C., such as at 121° C., 127° C., 135° C., and 149° C.

In embodiments of the invention, the hot melt adhesive composition comprises, consists essentially of, or consists of, the first polymer, the second polymer, the tackifying resin, and the plasticizer. In embodiments of the invention, the composition includes the first and second polymers and no other polymer.

The hot melt adhesive composition of the present invention may be formulated using any technique known in the art. A representative example of the mixing procedure involves placing all the components in a jacketed mixing vessel equipped with a rotor, and thereafter raising the temperature of the mixture to a range from 120° C. to 230° C. to melt the contents. It should be understood that the precise temperature to be used in this step would depend on the melting points of the particular ingredients. The constituents are individually or in certain combinations introduced to the vessel under agitation and the mixing is allowed to continue until a consistent and uniform mixture is formed.

In an embodiment of the invention, the adhesive is made using a traditional overhead mixer at about 180° C. First, the plasticizer, tackifier, and any antioxidant(s) are heated to desired temperature under an inert blanket and stirring is started for homogeneity. The order of polymer addition does not appear to impact the final result, although in some embodiments the first polymer component is added first. After all polymer is dissolved and the mix appears homogenous, the second polymer is added. Mixing while applying heat is continued until the mix is again homogenous and the second polymer is melted. Other conventional methods may be used to make the hot melt adhesive of the present invention. For example, methods employing static mixing, single screw extrusion, twin screw extrusion, and kneading, may be used. The hot melt adhesive is then cooled to room temperature and formed into chubs with a protective skin formed thereon or into pellets for shipment and use.

The resulting hot melt adhesive may then be applied to substrates using a variety of coating techniques. Examples include hot melt slot die coating, hot melt wheel coating, hot melt roller coating, melt-blown coating as well as slot, spiral spray, and wrapping spray methods such as those used to affix elastic strands. Spray techniques are numerous and can be done with or without assistance of compressed air that would shape the adhesive spray pattern. The hot melt adhesive material is generally pumped molten through hoses to the final coating spot on the substrates. Any application temperature above the softening point of the adhesive formulation is suitable.

The hot melt adhesive composition of the present invention may be used in a number of applications such as, for example, in disposable nonwoven hygienic articles, paper converting, flexible packaging, wood working, carton and case sealing, labeling and other assembly applications. Particularly preferred applications include diaper and adult incontinent brief elastic attachment, disposable diaper and feminine sanitary napkin construction, diaper and napkin core stabilization, diaper backsheet lamination, industrial filter material conversion, surgical gown and surgical drape assembly. It has been found that the adhesive of the invention is particularly useful as a construction adhesive in hygiene articles, such as diapers. Construction adhesives are typically used to bond a non-woven layer to a polyethylene film.

The adhesive of the present invention can also be used with any application where various substrate materials are involved. Examples include nonwoven materials and polymeric films. Any substrate material and any substrate form could be used in any combination possible with the adhesive serving to bond a single substrate folded over on itself or two or more substrates together. The substrates can be of multiple forms, for example fiber, film, thread, strip, ribbon, tape, coating, foil, sheet, and band. The substrate can be of any known composition for example polyolefin, polyacrylic, polyester, polyvinyl chloride, polystyrene, cellulosic like wood, cardboard or paper. The bulk substrate's mechanical behavior can be rigid, plastic, or elastomeric. The above lists are not limitative or all-inclusive, but are only provided as common examples.

In an embodiment of the invention, a method of making a laminate comprises the steps of: (1) applying the hot melt adhesive composition of the invention in a molten state to a primary substrate; and (2) mating a secondary substrate to the primary substrate by contacting the secondary substrate with the adhesive composition. Upon allowing the adhesive to cool, the adhesive bonds the primary substrate to the secondary substrate. In embodiments in which the adhesive is suitable for use as a construction adhesive, the primary substrate may be a polyolefin film, such as polyethylene, and the secondary substrate may be a nonwoven material or layer.

In alternative embodiments of the invention, the adhesive is applied to the first substrate using a direct contact method of hot melt application, such as a slot or V-slot applicator head. Alternatively, the adhesive may be applied to the first substrate using a non-contact method of hot melt, such as a spray applicator.

According to embodiments of the invention, a hot melt adhesive composition comprises: (a) between about 35% and about 55%, preferably between about 40% and about 50%, and most preferably between about 42% and about 47%, by weight, of a first polymer comprising a unimodal copolymer of propylene and ethylene and having a weight average molecular weight of between about 5,000 and 60,000 daltons; (b) between about 0.5% and about 7%, preferably between about 1% and 5%, and most preferably between about 1% and about 4%, by weight of a second polymer comprising a copolymer of propylene and ethylene and having a weight average molecular weight of at least 100,000 daltons; (c) between about 30% and about 60%, preferably between about 32% and about 50%, and most preferably between about 35% and about 45%, by weight of a tackifying resin having a Ring & Ball softening point of at most 115° C.; and (d) between about 5% and about 20%, preferably between about 7% and about 18%, and most preferably between about 10% and about 16%, by weight of a plasticizer, wherein the weight ratio of the first polymer to the second polymer is between about 200:1 and 9:1, preferably between about 75:1 and about 10:1, and most preferably between about 50:1 and about 15:1, and the viscosity of the composition is equal to or less than about 30,000 cP at 121° C., preferably less than about 25,000 cP at 121° ° C., more preferably less than about 20,000 cP at 121° C. According to other embodiments of the invention, the combined weight of the first and second polymers comprises between about 31% and about 72%, preferably between about 36% and about 55%, and most preferably between about 40% and about 50%, based on the total weight of the hot melt adhesive composition.

According to another embodiment of the invention, a hot melt adhesive composition comprises: (a) about 30% to about 72% by weight of a first polymer comprising a unimodal copolymer of propylene and ethylene and having a weight average molecular weight of between about 20,000 and 55,000 daltons, a heat of fusion of between about 5 to about 35 J/g, a polydispersity index of between about 1.5 to about 6, has an ethylene content of between about 5 wt % and about 25 wt %, a melting temperature of between about 70° C. to about 130° C., and a glass transition temperature of between about −45° C. to about −5° C.; (b) about 0.1% to about 8% of a second polymer comprising a copolymer of propylene and ethylene and having a weight average molecular weight of at least 100,000 daltons; (c) about 25% to about 65% by weight of a tackifying resin having a Ring & Ball softening point of at most 115° C.; and (d) about 2% to about 25% by weight of a plasticizer, wherein the weight ratio of the first polymer to the second polymer is between about 500:1 and 9:1 and the viscosity of the composition (measured by ASTM D3236) is equal to or less than about 35,000 cP at 121° C.

In accordance with an embodiment of the present invention, a hot melt adhesive composition comprises (a) a first polymer comprising a unimodal copolymer of propylene and ethylene and having a weight average molecular weight of between about 5,000 and 60,000 daltons; (b) a second polymer comprising a copolymer of propylene and ethylene and having a weight average molecular weight of at least 100,000 daltons; (c) a tackifying resin having a Ring & Ball softening point of at most 115° C.; and (d) a plasticizer, wherein the viscosity of the composition is equal to or less than about 35,000 cP at 121° C. and the first polymer, the second polymer, the tackifying resin, and the plasticizer are present in amounts effective to provide a hot melt adhesive composition which has: (1) a peel strength of at least 150 grams-force initially and at least 250 grams-force after aging at 54.5° C. when applied at 2 gsm add-on between a polyethylene film and a non-woven layer; (2) a peel strength of at least 100 grams-force initially when applied at 1 gsm add-on between a polyethylene film and a non-woven layer; and (3) a shear value of at least 50 minutes at 37.8° C. when applied between two non-woven layers and using a 250 gram weight. Although adhesives of the present invention are believed to be able to achieve this peel and shear performance with a variety of substrates and add-on levels, an embodiment of the invention uses the specific substrates and conditions as set forth below in the examples.

ASPECTS OF THE INVENTION

1. A hot melt adhesive composition comprising:
   (a) about 30% to about 72% by weight of a first polymer comprising a unimodal copolymer of propylene and ethylene and having a weight average molecular weight of between about 5,000 and 60,000 daltons;
   (b) about 0.1% to about 8% of a second polymer comprising a copolymer of propylene and ethylene and having a weight average molecular weight of at least 100,000 daltons;
   (c) about 25% to about 65% by weight of a tackifying resin having a Ring & Ball softening point of at most 115° C.; and
   (d) about 2% to about 25% by weight of a plasticizer, wherein the weight ratio of the first polymer to the second polymer is between about 500:1 and 9:1 and the viscosity of the composition is equal to or less than about 35,000 cP at 121° C.
2. A hot melt adhesive composition comprising:
   (a) a first polymer comprising a unimodal copolymer of propylene and ethylene and having a weight average molecular weight of between about 5,000 and 60,000 daltons;
   (b) a second polymer comprising a copolymer of propylene and ethylene and to having a weight average molecular weight of at least 100,000 daltons;
   (c) a tackifying resin having a Ring & Ball softening point of at most 115° C.; and
   (d) a plasticizer,
      wherein the viscosity of the composition is equal to or less than about 35,000 cP at 121° C. and the first polymer, the second polymer, the tackifying resin, and the plasticizer are present in amounts effective to provide a hot melt adhesive composition which has: (1) a peel strength of at least 150 grams-force initially and at least 250 grams-force after aging at 54.5° C. when applied at 2 gsm add-on between a polyethylene film and a non-woven layer; (2) a peel strength of at least 100 grams-force initially when applied at 1 gsm add-on between a polyethylene film and a non-woven layer; and (3) a shear value of at least 50 minutes at 37.8° C. when applied between two non-woven layers and using a 250 gram weight.

3. The composition of any of Aspects 1 or 2, wherein:
the first polymer is present in an amount of between about 35% and about 55%, preferably between about 40% and about 50%, and most preferably between about 42% and about 47%, by weight;
the second polymer is present in an amount of between about 0.5% and about 7%, preferably between about 1% and 5%, and most preferably between about 1% and about 4%, by weight;
the tackifying resin is present in an amount of between about 30% and about 60%, preferably between about 32% and about 50%, and most preferably between about 35% and about 45%, by weight;
the plasticizer is present in an amount of between about 5% and about 20%, preferably between about 7% and about 18%, and most preferably between about 10% and about 16%, by weight;
the weight ratio of the first polymer to the second polymer is between about 200:1 and 9:1, preferably between about 75:1 and about 10:1, and most preferably between about 50:1 and about 15:1; and
the viscosity of the composition is equal to or less than about 30,000 cP at 121° C., preferably less than about 25,000 cP at 121° C., more preferably less than about 20,000 cP at 121° C.

4. The composition of any of Aspects 1-3, wherein:
the first polymer has a heat of fusion of between about 5 and about 35 J/g, preferably between about 10 and about 29 J/g, more preferably between about and about 25 J/g, and most preferably between about 18 and about 22 J/g; and
the second polymer has a heat of fusion of between about 2.5 and about J/g, preferably between about 3 and about 15 J/g, more preferably between about 3.5 and about 10 J/g, and most preferably between about 6 and about 9 J/g.

5. The composition of any of Aspects 1-4, wherein:
the first polymer has a polydispersity index of between about 1.5 and about 6, preferably between about 1.8 and about 5, more preferably between about 2 and about 3, and most preferably between about 2.2 and about 2.8; and
the second polymer has a polydispersity index of between about 1.5 and about 6, preferably between about 1.8 and about 5, more preferably between about 2 and about 3, and most preferably between about 2.2 and about 2.8.

6. The composition of any of Aspects 1-5, wherein:
the weight average molecular weight of the first polymer is between about 20,000 and about 55,000 daltons, preferably between about 30,000 and about 52,000 daltons, more preferably between about 35,000 and about 50,000 daltons, and most preferably between about 40,000 and about 48,000 daltons; and
the weight average molecular weight of the second polymer is between about 100,000 and about 250,000 daltons, preferably between about 100,000 and about 200,000 daltons, more preferably between about 100,000 and about 150,000 daltons, and most preferably between about 105,000 and about 125,000 daltons.

7. The composition of any of Aspects 1-6, wherein:
the first polymer has an ethylene content of between about 5% and about 25%, preferably between about 7% and about 20%, more preferably between about 9% and about 17%, and most preferably between about 10% and about 15%; and
the second polymer has an ethylene content of between about 5% and about 25%, preferably between about 7% and about 20%, more preferably between about 9% and about 17%, and most preferably between about 10% and about 15%.

8. The composition of any of Aspects 1-7, wherein:
the first polymer has a melting temperature of between about 70° C. to about 130° C., preferably between about 75° C. and about 125° C., more preferably between about 85° C. and about 115° C., and most preferably between about 90° C. and about 110° C.; and
the second polymer has a melting temperature of between about 35° C. and about 100° C., preferably between about 40° C. and about 90° C., more preferably between about 50° C. and about 80° C., and most preferably between about 55° C. and about 75° C.

9. The composition of any of Aspects 1-8, wherein:
the first polymer has a glass transition temperature of between about −45° C. and about −5° C., preferably between about −35° C. and about −15° C., more preferably between about −32° C. and about −20° C., and most preferably between about −30° C. and about −22° C.; and
the second polymer has a glass transition temperature of between about −45° C. and about −5° C., preferably between about −35° C. and −15° C., more preferably between about −32° C. and −20° C., and most preferably between about −30° C. and −22° C.

10. The composition of any of Aspects 1-9, wherein the tackifier is selected from the group consisting of aliphatic and cycloaliphatic hydrocarbon resins and their hydrogenated derivatives, hydrogenated aromatic hydrocarbon resins, aromatically modified aliphatic or cycloaliphatic resins and their hydrogenated derivatives, polyterpene and styrenated polyterpene resins and mixtures thereof.

11. The composition of any of Aspects 1-10, wherein the plasticizer is selected from the group consisting of mineral oil and liquid polybutene.

12. A composition of any of Aspects 1-11 further comprising a stabilizer or antioxidant.

13. The composition of any of Aspects 1-12 further comprising a wax.

14. The composition of Aspect 13, wherein the wax is present in the amount between about 0.1% and about 20% by weight.

15. The composition of any of Aspects 1-14, wherein the combined weight of the first and second polymers comprises between about 31% and about 72%, preferably between about 36% and about 55%, and most preferably between about 40% and about 50%, based on the total weight of the hot melt adhesive composition.

16. The composition of any of Aspects 1-15, wherein:
the first polymer has a heat of fusion of between about 5 to about 35 J/g;

the first polymer has a polydispersity index of between about 1.5 to about 6;
the weight average molecular weight of the first polymer is between about 20,000 and about 55,000 daltons;
the first polymer has an ethylene content of between about 5% and about 25%;
the first polymer has a melting temperature of between about 70° C. to about 130° C.; and
the first polymer has a glass transition temperature of between about −45° C. to about −5° C.
17. A method of making a laminate comprising the steps of:
applying the hot melt adhesive composition of any of Aspects 1 to 16 in a molten state to a primary substrate; and mating a secondary substrate to the first substrate by contacting the secondary substrate with the adhesive composition.
18. The method of Aspect 17, where the primary substrate is a polyethylene film.
19. The method of any of Aspect 17 or 18, wherein the secondary substrate is a non-woven layer.
20. The laminate made by the methods of any of Aspects 17-19.

Examples

The following examples are illustrative but not limiting of the invention.

Viscosity was measured according to ASTM D3236 at 121° C. The spindle speed was adjusted so the percent torque was between 45% and 90%.

Ring & Ball softening points were determined with an automated Herzog unit according to the method set forth in ASTM E-28.

Raw Materials:
Calsol 5550 is a naphthenic process oil available from Calumet Specialty Products.
Eastotac H-100W is a hydrogenated hydrocarbon resin with a ring and ball softening point of 100° C. available from Eastman Chemical Company.
Escorez 5615 is a hydrogenated aromatic modified cycloaliphatic hydrocarbon resin with a ring and ball softening point of 118° C. available from ExxonMobil Corporation
Irganox 1010 is an antioxidant which is pentaerythritol tetrakis(3-(3,5-di-tert-butyl-4-hydroxyphenyl)propionate), a hindered phenol, available from BASF SE.
Vistamaxx 8380, obtained from Exxonmobil Chemical Company, Houston, Tex., is a low molecular weight, low viscosity metallocene-catalyzed random propylene-ethylene copolymer. It has about 12 wt % of ethylene comonomer and a weight average molecular weight (Mw) of about 43,000 g/mol, a DSC melting point of about 100° C., a DSC melt enthalpy of about 20 J/g.
Vistamaxx 6502, obtained from Exxonmobil Chemical Company, Houston, Tex., is an essentially amorphous copolymer containing about 13 wt % of ethylene comonomer and having a weight average molecular weight (Mw) of about 119,000 g/mol, a DSC melting point of about 64° C., and a DSC melt enthalpy of about 9 J/g.

The adhesives were formulated by melting the oil, tackifier, and antioxidant at about 180° C. under a nitrogen blanket. Then, the lower molecular weight polymer (Vistamaxx 8380) was added. Once the formulation regained the temperature before the polymer addition and appeared homogenous, the second, higher weight polymer was added. Mixing of the formulation continued until it was completely homogenous and no polymer beads were visible.

The adhesive was used to form a bilaminate comprised of a primary substrate with an adhesive layer which later joins a secondary substrate. Typically, these laminates were created with 2 gsm adhesive applied with the Nordson Signature nozzle at a speed of 900 ft/min and an open time (time for the adhesive to contact the secondary layer) of 0.25 sec. The application temperature was 149° C. and a 40 psi compression. While many types of substrates could be utilized as either primary and/or secondary components, the primary substrate used in the examples below for peel performance testing was DH284, which is a 24 gsm non-breathable polyethylene film commercially available from Clopay Plastics Products. The secondary substrate used for the peel performance testing was a gsm spunbond nonwoven available from First Quality Enterprises. Shear testing was conducted on a bilaminate wherein both primary and secondary substrates were a 50 gsm melt blown nonwoven from Berry Global.

In order to determine the adhesive peel performance, the laminates were either tested "initially" (meaning that they were allowed to age at room temperature for about 24 hours) or were subjected to various aging times, such as 1, 2, or 4 weeks, at 54.5° C. Then, the laminates were pulled apart by an Instron tensile tester at a rate of 12 inches per minute in a 180 degree "T-shape" peel in a climate controlled room, which was maintained at a constant 23.9° C. and 50% relative humidity. The peel force was measured in grams-force, and the peel value was calculated by determining the average peel strength after eliminating the first and last five percent of the sample length to reduce variability from starting and stopping the test. This test was performed using an add-on level of one or two grams per square meter, as shown in the results below.

To determine shear performance, the adhesive is applied in a 1" slot pattern at an add-on level of 15 gsm. The laminate was tested for shear testing the following day after fabrication. To run a shear test, a 1" strip of laminate is cut out. In an oven at 37.8° C., the primary substrate is hung secure while a 250 g weight is attached to the secondary substrate. When the adhesive fails cohesively, the weight drops to stop a timer to give the hang time in minutes.

Shown below are the weight percentages of the various constituents used. As can be seen, the formulation of Example 1 (EX1) uses a tackifier having a ring and ball softening point of 100° C., while the tackifier used in Comparative Example 2 (CE2) has a ring and ball softening point of 118° C. The ratio of low molecular weight polymer to high molecular weight polymer in both cases is about 22.2:1. In Comparative Example 3 (CE3), no high molecular weight polymer was used.

|  | EX1 | CE2 | CE3 |
|---|---|---|---|
| Calsol 5550 | 13.0 | 13.0 | 13.0 |
| Eastotac H-100W | 40.0 | 0.0 | 40.0 |
| Escorez 5615 | 0.0 | 40.0 | 0.0 |
| Irganox 1010 | 0.5 | 0.5 | 0.5 |
| Vistmaxx 8380 | 44.5 | 44.5 | 46.5 |
| Vistamaxx 6502 | 2.0 | 2.0 | 0.0 |
| Ring and Ball Softening Point, ° C. | 93.3 | 95.1 | 91.7 |
| Viscosity at 148.9° C., cP | 4,812 | 5,425 | 3,950 |
| Viscosity at 121.0° C., cP | 15,120 | 17,970 | 12,300 |
| Initial 2 gsm Peel, gf | 283.7 | 302.0 | 226.7 |

|  | EX1 | CE2 | CE3 |
|---|---|---|---|
| (Standard deviation) | 10.3 | 13.6 | 46.3 |
| One-Week Aged 2 gsm Peel at 54.5° C., gf | 361.3 | 100.9 | 406.1 |
| Standard deviation) | 26.8 | 6.8 | 90.6 |
| Initial 1 gsm, peel, gf | 116.1 | — | — |
| (Standard deviation) | 7.3 | — | — |
| One-Week Aged 1 gsm Peel at 54.5° C., gf | 199.9 | — | — |
| (Standard deviation) | 7.4 | — | — |

In some applications, an appropriate target peel performance at 2 gsm add-on may be 150 gf when tested initially and 250 gf after the laminates have aged at 54.5° C. The formulation of Example 1 meets this peel criteria, but when using a higher softening point tackifier (as in Comparative Example 2), the aged peel performance drops off significantly. The inventive Example 1 shows desirable peel performance (e.g., greater than 100 gf) at lower add-on weight (i.e., 1 gsm) as well. The formulation without high molecular weight polymer (CE3) has good initial peel performance, but its peel performance drops below 100 gf after aging and it does not provide adequate shear strength in some applications.

Figure 1:
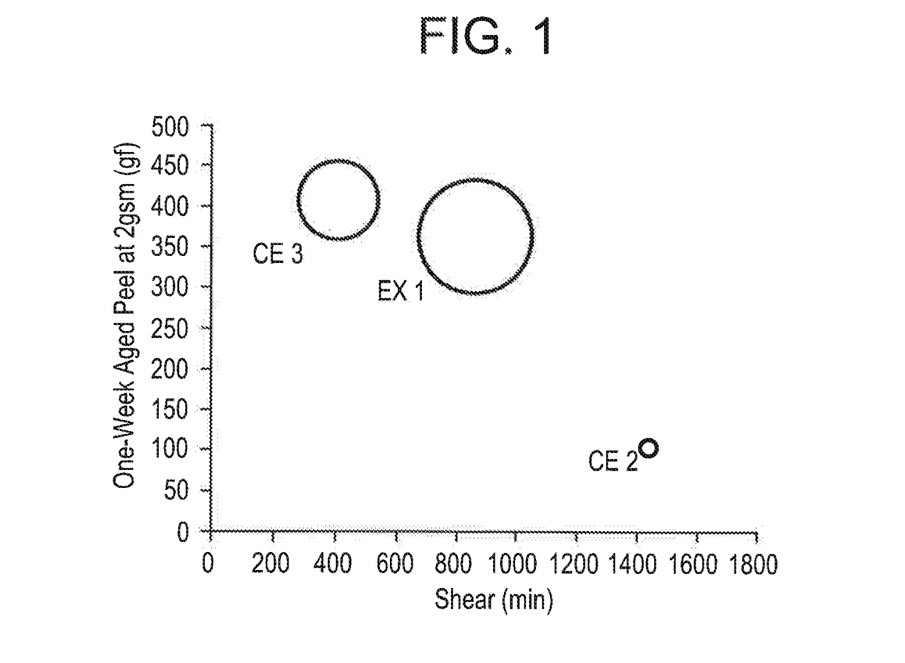
FIG. 1 shows peel performance after one week of aging versus shear strength for an exemplary formulation of the present invention and two comparative examples, with the size of the circles representing the standard deviation.

FIG. 1 shows peel performance after one week of aging versus shear strength for EX1, CE2, and CE3, with the size of the circles representing the standard deviation. As can be seen, the formulation of the present invention performed better in shear testing than CE3 and better in peel testing than CE2.

Figure 2:
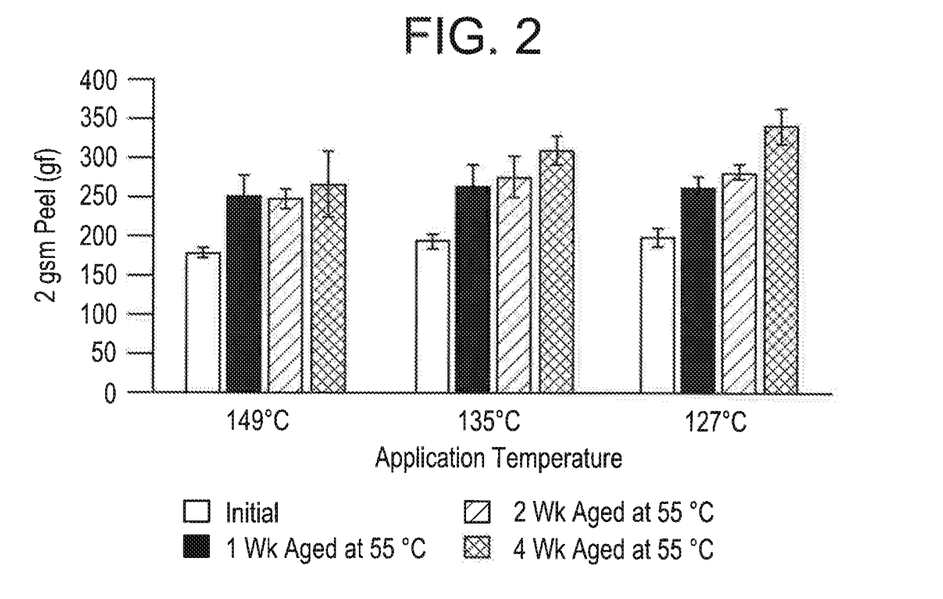
FIG. 2 shows peel performance, both initially and after various aging environments, of an exemplary formulation of the present invention at three different application temperatures.

FIG. 2 shows peel performance, both initially and after aging environments of 1, 2, and 4 weeks, of EX1 at three different application temperatures, namely at 127° C., 135° C., and 149° C. The formulation of EX1 was sprayable at all application temperatures and had a sufficiently low viscosity at 121° C. (15,120 cP) to be applied as a construction adhesive using many commercially available application systems. FIG. 2 demonstrates that the present invention provides a formulation having consistent peel performance at a standard application temperature (149° C.) and at low application temperatures (135° C. and 127° C.).

Figure 3:
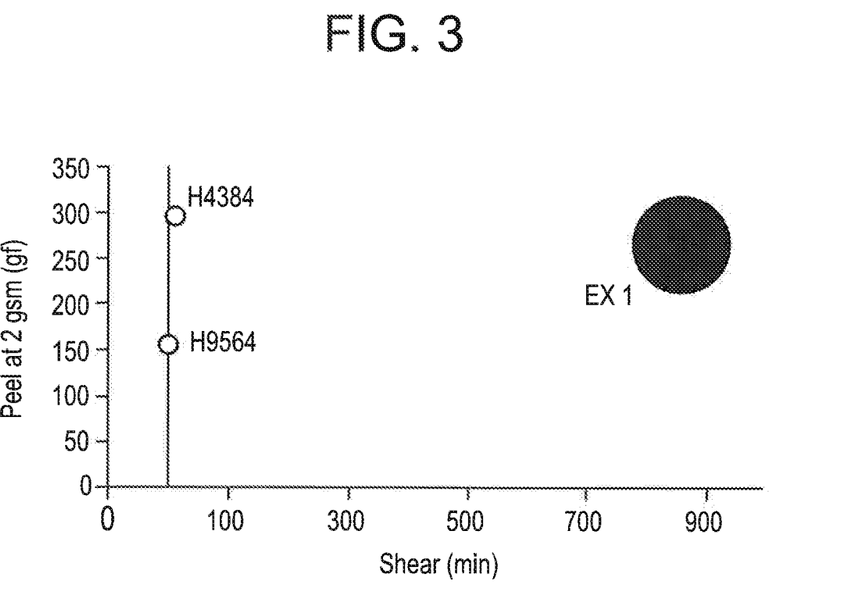
FIG. 3 shows peel performance after one week of aging versus shear strength for an exemplary formulation of the present invention and two comparative examples, with the size of the circles representing the standard deviation.

FIG. 3 shows peel performance after one week of aging versus shear strength for EX 1 and two commercially-available formulations. H9564 is a polyolefin-based construction adhesive commercially available from Bostik. H4384 is a styrene-block-copolymer construction adhesive commercially available from Bostik. As can be seen, the formulation of the present invention provides significantly better shear performance than either of these formulations and better peel performance than H9564.

Where a range of values is provided, it is understood that each intervening value, and any combination or sub-combination of intervening values, between the upper and lower limit of that range and any other stated or intervening value in that stated range, is encompassed within the range of values recited. In addition, the invention includes a range of a constituent which is the lower limit of a first range and an upper limit of a second range of that constituent.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue or prior invention.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A hot melt adhesive composition comprising:
   (a) about 30% to about 72% by weight of a first polymer comprising a unimodal copolymer of propylene and ethylene and having a weight average molecular weight of between about 5,000 and 60,000 daltons and a heat of fusion of between about 5 and about 25 J/g;
   (b) about 0.1% to about 8% of a second polymer comprising a copolymer of propylene and ethylene and having a weight average molecular weight of at least 100,000 daltons;
   (c) about 25% to about 65% by weight of a tackifying resin having a Ring & Ball softening point of at most 115° C.; and
   (d) about 2% to about 25% by weight of a plasticizer, wherein the weight ratio of the first polymer to the second polymer is between about 500:1 and 9:1 and the viscosity of the composition is equal to or less than about 35,000 cP at 121° C.

2. The composition of claim 1, wherein:
   the first polymer is present in an amount of between about 35% and about 55%;
   the second polymer is present in an amount of between about 0.5% and about 7%;
   the tackifying resin is present in an amount of between about 30% and about 60%;
   the plasticizer is present in an amount of between about 5% and about 20%;
   the weight ratio of the first polymer to the second polymer is between about 200:1 and about 15:1; and
   the viscosity of the composition is equal to or less than about 30,000 cP at 121° C.

3. The composition of claim 1, wherein:
   the first polymer has a heat of fusion of between 10 and about 22 J/g; and
   the second polymer has a heat of fusion of between about 2.5 and about 25 J/g.

4. The composition of claim 1, wherein:
   the first polymer has a polydispersity index of between about 1.5 and about 6; and
   the second polymer has a polydispersity index of between about 1.5 and about 6.

5. The composition of claim 1, wherein:
   the weight average molecular weight of the first polymer is between about 20,000 and about 55,000 daltons; and
   the weight average molecular weight of the second polymer is between about 100,000 and about 250,000 daltons.

6. The composition of claim 1, wherein:
   the first polymer has an ethylene content of between about 5% and about 25%; and
   the second polymer has an ethylene content of between about 5% and about 25%.

7. The composition of claim 1, wherein:
the first polymer has a melting temperature of between about 70° C. to about 130° C.; and
the second polymer has a melting temperature of between about 35° C. and about 100° C.

8. The composition of claim 1, wherein:
the first polymer has a glass transition temperature of between about −45° C. and about −5° C.; and
the second polymer has a glass transition temperature of between about 45° C. and about −5° C.

9. The composition of claim 1, wherein the tackifier is selected from the group consisting of aliphatic and cycloaliphatic hydrocarbon resins and their hydrogenated derivatives, hydrogenated aromatic hydrocarbon resins, aromatically modified aliphatic or cycloaliphatic resins and their hydrogenated derivatives, polyterpene and styrenated polyterpene resins and mixtures thereof.

10. The composition of claim 1, wherein the plasticizer is selected from the group consisting of mineral oil and liquid polybutene.

11. The composition of claim 1 further comprising a stabilizer or antioxidant.

12. The composition of claim 1 further comprising a wax.

13. The composition of claim 12, wherein the wax is present in the amount between about 0.1% and about 20% by weight.

14. The composition of claim 1, wherein the combined weight of the first polymer and the second polymer comprises between about 31% and about 72% based on the total weight of the hot melt adhesive composition.

15. The composition of claim 1, wherein:
the first polymer has a polydispersity index of between about 1.5 to about 6;
the weight average molecular weight of the first polymer is between about 20,000 and about 55,000 daltons;
the first polymer has an ethylene content of between about 5% and about 25%;
the first polymer has a melting temperature of between about 70° C. to about 130° C.; and
the first polymer has a glass transition temperature of between about −45° C. to about −5° C.

16. A method of making a laminate comprising the steps of:
applying the hot melt adhesive composition of claim 1 in a molten state to a primary substrate; and
mating a secondary substrate to the first substrate by contacting the secondary substrate with the adhesive composition.

17. The method of claim 16, where the primary substrate is a polyethylene film.

18. The method of claim 17, wherein the secondary substrate is a non-woven layer.

19. A hot melt adhesive composition comprising:
(a) a first polymer comprising a unimodal copolymer of propylene and ethylene and having a weight average molecular weight of between about 5,000 and 60,000 daltons and a heat of fusion of between about 5 and about 25 J/g;
(b) a second polymer comprising a copolymer of propylene and ethylene and having a weight average molecular weight of at least 100,000 daltons;
(c) a tackifying resin having a Ring & Ball softening point of at most 115° C.; and
(d) a plasticizer,
wherein the viscosity of the composition is equal to or less than about 35,000 cP at 121° C. and the first polymer, the second polymer, the tackifying resin, and the plasticizer are present in amounts effective to provide a hot melt adhesive composition which has: (1) a peel strength of at least 150 grams-force initially and at least 250 grams-force after aging at 54.5° C. when applied at 2 gsm add-on between a polyethylene film and a non-woven layer; (2) a peel strength of at least 100 grams-force initially when applied at 1 gsm add-on between a polyethylene film and a non-woven layer; and (3) a shear value of at least 50 minutes at 37.8° C. when applied between two non-woven layers and using a 250 gram weight.

* * * * *